United States Patent Office 3,136,205
Patented June 9, 1964

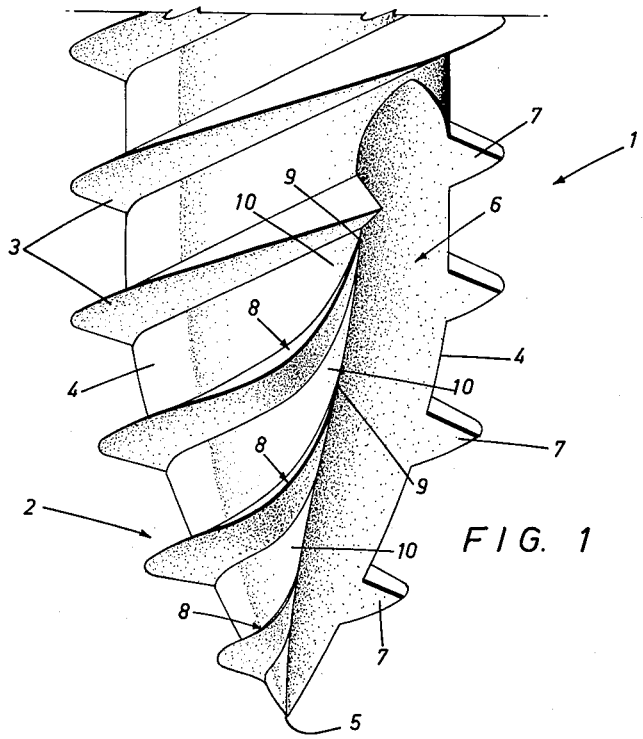
FIG. 1
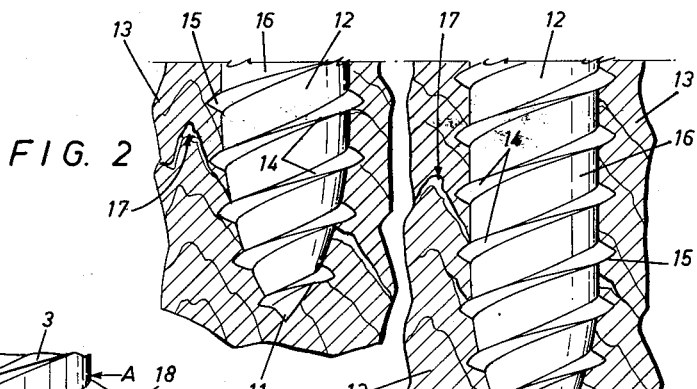
FIG. 2
FIG. 3
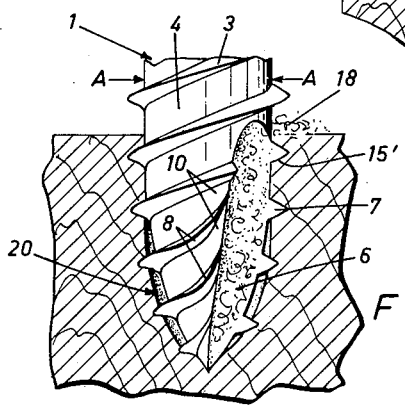
FIG. 4
Inventor
CARL H. ANSINGH
by: *Douglass Jrun*
Attorney

3,136,205
SELF-TAPPING WOOD SCREW
Carl H. Ansingh, Milton, Ontario, Canada, assignor to
P. L. Robertson Mfg. Co. Limited
Filed Feb. 19, 1962, Ser. No. 174,040
9 Claims. (Cl. 85—47)

This invention relates to improvements in wood screws and is applicable to wood screws having either single or multiple threads and either cut or rolled threads.

More particularly the invention relates to a self-tapping wood screw and the principal object of the invention is to provide a wood screw which will efficiently form and clear its own lead hole to greatly facilitate penetration of the screw and to substantially eliminate splitting and cracking of the wood.

The principal feature of the invention resides in providing a screw with a threaded pointed portion and interrupting the threads thereof in the pointed portion to present a plurality of cutting or chisel formations adapted to cut the wood fibres along spiral lanes as the screw penetrates the wood and a plurality of wood clearing or auger formations to clear wood fibres cut from the spiral lanes and to cut or shave the wood at least in part between the spiral lanes, the screw having a discharge groove or flute between the chisel and auger formations into which the cut and shaved wood particles or chips are fed to be delivered thereby to or towards the surface of the wood into which the screw is penetrating.

Another important feature resides in defining a wood fibre or chip flow path between the auger formations or elements and the adjoining threads leading into the discharge groove or flute.

According to the preferred form of the invention the auger formations or elements are formed to have a lesser height than the cutting or chisel elements and are disposed and arranged to extend partially across the lands defined between the screw threads at one side of the discharge groove or flute while the cutting or chisel elements are disposed at the other side of such groove or flute.

Again, according to the preferred form of the invention, each of the auger formations or elements is inclined relative to the screw axis in extending upwardly across the land from one thread towards another adjacent which it terminates and gradually reduces in height towards its terminal.

Further, according to the preferred form of the invention, the discharge groove or flute is inclined relative to the screw axis retreating from the direction of screw rotation for screw advance.

These and other objects and features will become apparent from the following detailed description in which:

FIGURE 1 is an elevational view of the pointed portion of a wood screw embodying the invention, the remaining portion of the screw, which is conventional, being broken away.

FIGURES 2 and 3 are fragmented part elevational, part vertical sectional views illustrating the wood splitting tendency accompanying the penetration of a conventional wood screw.

FIGURE 4 is a fragmented part elevational, part vertical sectional view illustrating the wood penetrating action of a screw embodying the invention.

With reference to FIGURE 1, there is shown a screw generally designated at 1 which is conventional except with respect to the pointed portion or lower end 2, the screw having the usual spiral threads 3 formed thereon, such threads being generally of triangular cross section. Such threads may be formed by cutting, rolling and it will be understood that the screw may be formed with a single thread, double thread or other thread multiples without departing from the invention.

Defined between the threads 3 are spiral lands 4, such lands of course being inherently present whether the threads are cut or rolled.

Extending up from the tip 5 of the pointed portion 2 of the screw is a groove or flute 6 which interrupts the threads 3 causing such interrupted threads to present a plurality of generally triangular cross section wood cutting chisel elements or formations 7.

At the opposite side of the groove 6 the threads 3 are turned upwardly as at 8 to project at least part way across the lands 4 between adjacent threads, such upwardly turned thread portions constituting wood cutting and clearing auger elements. These auger elements 8 preferably progressively decrease in height and width upwardly of the screw tip towards their terminals 9 and with at least the major portions thereof of a lesser height than the chisel elements 7.

Defined between the terminals 9 of the auger elements 8 and the next adjacent screw thread are discharge passages 10 leading into the groove or flute 6.

Preferably the groove or flute 6 is angularly inclined with respect to the screw axis in a direction receding from the direction of screw rotation to advance the screw, that is, the groove being inclined in the opposite hand to the threads.

Additionally the auger elements 8 are also inclined to the axis of the screw, again receding upwardly around the screw with respect to the direction of screw rotation for screw advance.

As illustrated in FIGURES 2 and 3, when the pointed portion 11 of a conventional screw 12 is forced into a wood piece 13, the threads 14 merely serve as wood fibre parting members to clear spiral paths 15 for subsequent threads which advance the screw into the wood. When, by virtue of such feed, the shank 16 of the screw is forced into the wood, the increased diameter of the screw in the shank portion tends to split the wood as indicated at 17.

With a screw embodying the present invention as illustrated in FIGURE 5, the wood cutting chisel elements 7 act to cut the wood fibres rather than merely part or separate same clearing spiral paths 15' from which wood chips 18 are actually removed. These chips will flow around the spiral paths formed by the lands 4 between the threads 3 and they will be delivered through the discharge passages 10 into the groove or flute 6 which provides a path allowing such wood chips to clear out of the wood piece as illustrated in FIGURE 5.

Additionally, the auger elements 8 sweep a path between the spiral path 15' as the screw advances, with the result that the chisel and auger carrying screw point provide a drilling action drilling a hole designated generally at 20 in FIGURE 4, with the diameter of such hole being substantially equal to the root diameter of the screw, that is the diameter between the arrows A—A in FIGURE 4.

It will thus be appreciated that by the formation of the chisel elements 7 and auger elements 8 in conjunction with the clearing groove or flute 6, the pointed portion 2 of the screw 1 will automatically form its own lead hole pairing away the wood particles thereby to eliminate the forces causing the splitting of wood as illustrated in conjunction with the conventional screw in FIGURES 2 to 4.

The pointed portion 2 of the screw 1 is in itself preferably fairly sharp with the loci of the thread roots being inclined to the screw axis preferably in the neighbourhood of 30°, such pointed portion being generally referred to as the gimlet point although it will be appreciated that the invention also has utility with respect to blunter points.

It will be understood that as the screw moves further into the wood blocking immediate discharge of wood chips from the groove 6, such chips can feed upwardly in a spiral path as afforded by the lands 4 without exerting any untoward latteral pressures due to the fact that the pointed portion 2 of the screw has already drilled the lead hole 20 to the root diameter of the threads.

While the use of a single groove 6 has been found satisfactory, it will be understood that two or more corresponding grooves presenting corresponding sets of chisel elements 7 and auger elements 8 may be employed if desired.

It will also be understood that other variations in the specific detail of the thread formations and the configuration of the cutting and auger elements may be made without departing from the spirit of the invention or scope of the appended claims.

What I claim is:

1. A self-tapping wood screw provided with a pointed portion having spiral thread formations formed thereon separated by spiral lands, said spiral thread formations being interrupted by a groove extending upwardly substantially from the tip of said pointed portion and presenting at one edge thereof a plurality of wood cutting chisel elements, the thread formations at the opposite side of said groove at least at the lower end of the screw being turned upwardly with respect to the said tip to extend at least part way across said lands at gradually reducing height from the screw axis and presenting sharp upper edges to form a plurality of wood clearing and cutting auger elements.

2. A self-tapping wood screw as claimed in claim 1 in which said auger elements are inclined with respect to the axis of the screw in their extent across said lands.

3. A self-tapping screw as claimed in claim 1 in which discharge passages leading into said groove are defined between the ends of said auger elements and the next adjacent thread formations.

4. A self-tapping screw as claimed in claim 1 in which said groove is inclined with respect to the screw axis in a direction receding from the direction of screw rotation for screw advance.

5. A self-tapping screw as claimed in claim 1 in which said thread formations at said opposite side of said groove extend a progressively increasing distance across the lands as the thread progresses up the screw from the tip of said pointed portion.

6. A self-tapping screw as claimed in claim 1 in which said upwardly turned thread formations curve upwardly in a smooth sweep approaching parallelism with the screw axis at their upper ends.

7. A self-tapping screw as claimed in claim 5 in which at least the upper of said upwardly turned thread formations extends a major portion of the distance across the adjoining land.

8. A self-tapping wood screw provided with a pointed portion having spiral thread formations of generally triangular cross section formed thereon separated by spiral lands, said spiral thread formations being interrupted by a groove extending upwardly substantially from the tip of said pointed portion, said interrupted threads presenting at one side of said groove a plurality of generally triangularly shaped wood fibre cutting chisel elements adapted to cut spiral lanes, said interrupted threads at the opposite side of said groove at least at the lower end of said pointed portion being turned upwardly to extend at least part way across the lands formed between adjacent threads at gradually reducing height from the screw axis and presenting sharp upper edges to form wood cutting and clearing auger elements adapted to clear out wood between the lanes cut by said chisel elements.

9. A self-tapping wood screw as claimed in claim 8 in which said auger elements terminate short of the next adjacent thread formation to define discharge paths at the end thereof leading into said groove.

References Cited in the file of this patent

UNITED STATES PATENTS

| | | |
|---|---|---|
| 1,235,626 | Woodward | Aug. 7, 1917 |
| 1,245,362 | Lynch | Nov. 6, 1917 |
| 1,408,205 | Jfanger | Feb. 28, 1922 |
| 2,177,005 | Putell | Oct. 24, 1939 |

FOREIGN PATENTS

| | | |
|---|---|---|
| 669,157 | Great Britain | Mar. 26, 1952 |